United States Patent
Nagashima et al.

(10) Patent No.: US 8,467,582 B2
(45) Date of Patent: Jun. 18, 2013

(54) IMAGE RECOGNIZING APPARATUS, INCLUDING SHARED RIGHT-OF-USE TO CLIENT DEVICES, CONTROL METHOD, AND STORAGE MEDIUM

(75) Inventors: Fumitada Nagashima, Kawasaki (JP); Kinya Osa, Tokyo (JP)

(73) Assignee: Canon Kabushiki Kaisha (JP)

( * ) Notice: Subject to any disclaimer, the term of this patent is extended or adjusted under 35 U.S.C. 154(b) by 850 days.

(21) Appl. No.: 12/571,796

(22) Filed: Oct. 1, 2009

(65) Prior Publication Data
US 2010/0080465 A1   Apr. 1, 2010

(30) Foreign Application Priority Data
Oct. 1, 2008 (JP) ................. 2008-256371

(51) Int. Cl.
G06K 9/00 (2006.01)
(52) U.S. Cl.
CPC ........ G06K 9/00993 (2013.01); G06K 9/00221 (2013.01)
USPC ......... 382/118; 382/224; 709/203; 348/211.3
(58) Field of Classification Search
None
See application file for complete search history.

(56) References Cited

U.S. PATENT DOCUMENTS

| 6,067,624 A | 5/2000 | Kuno | |
|---|---|---|---|
| 6,239,836 B1 * | 5/2001 | Suzuki et al. | 348/211.3 |
| 6,539,441 B1 * | 3/2003 | Dieckman et al. | 710/73 |
| 6,597,393 B2 * | 7/2003 | Kato et al. | 348/211.99 |
| 6,965,399 B1 * | 11/2005 | Oka et al. | 348/211.99 |
| 7,161,623 B2 * | 1/2007 | Kuno | 348/211.3 |
| 7,210,863 B2 * | 5/2007 | Nakamura | 396/427 |
| 2010/0046840 A1 * | 2/2010 | Hashiguchi et al. | 382/201 |

FOREIGN PATENT DOCUMENTS

| JP | 10-042278 A | 2/1998 |
|---|---|---|
| JP | 2008-172623 A | 7/2008 |

OTHER PUBLICATIONS

Japanese Office Action issued in Japanese counterpart application No. JP2008-256371, dated Nov. 27, 2012.

* cited by examiner

*Primary Examiner* — Barry Drennan
(74) *Attorney, Agent, or Firm* — Rossi, Kimms & McDowell LLP

(57) ABSTRACT

An image recognizing apparatus which makes it possible to shorten waiting time before the start of image recognition processing for recognition objects requested by clients. A registering section registers designating information designating recognition objects in image data and a recognition termination condition for terminating recognition carried out by an image recognizing section, which are transmitted from each of the clients that have requested the right of use of the image recognizing section, in association with each of the clients. A client managing section causes the image recognizing section to carry out recognition based on the registered designating information for a client apparatus given the right of use, and carries out control to change the right of use to the next client apparatus when the registered recognition termination condition is satisfied.

6 Claims, 6 Drawing Sheets

*FIG. 2*

|  | RECOGNITION OBJECT | RECOGNITION TERMINATION CONDITION |
|---|---|---|
| CLIENT 6 | MALE | THREE |
| CLIENT 7 | FEMALE | TEN |
| CLIENT 8 | CHILD | SEVEN |

IMAGE RECOGNIZING APPARATUS, INCLUDING SHARED RIGHT-OF-USE TO CLIENT DEVICES, CONTROL METHOD, AND STORAGE MEDIUM

BACKGROUND OF THE INVENTION

1. Field of the Invention

The present invention relates to an image recognizing apparatus that can be shared by a plurality of client apparatuses, a control method, and a computer-readable storage medium that stores a program for implementing the method.

2. Description of the Related Art

Conventionally, there has been an image recognizing apparatus that has the function of recognizing images such as an image picked up by an image pickup device (discriminating between an adult and a child, discriminating a male and a female, and so on). Also, there has been an image recognizing system in which one image recognizing apparatus and a plurality of client apparatuses (hereafter referred to as clients) are connected together via a network, and the plurality of clients can be provided with image recognition processing by sharing the one image recognizing apparatus.

FIG. 5 is a block diagram schematically showing an example of the construction of an image recognizing system with a shared image recognizing apparatus at its center according to a prior art.

Referring to FIG. 5, a plurality of clients 56, 57, and 58 are connected to a shared image recognizing apparatus 50 via a network 59. The shared image recognizing apparatus 50 is comprised of a camera 51 (for example, a video camera or a still camera), an image recognition processing section 52, a recognition object registering section 53, a recognition result storing section 54, and a client managing section 55. At predetermined time intervals, the client managing section 55 sequentially gives the right of use of the shared image recognizing apparatus 50 (image recognition processing section 52) to the plurality of clients that have made requests.

First, a description will be given of operation in the case that a single, client uses the shared image recognizing apparatus 50 in the above-mentioned conventional image recognizing system. The client 56 transmits information designating a recognition object to the shared image recognizing apparatus 50 via the network 59 and requests image recognition processing. The client managing section 55 of the shared image recognizing apparatus 50 registers the information designating the recognition object in the recognition object registering section 53.

The image recognition processing section 52 recognizes the recognition object registered in the recognition object registering section 53 from image data inputted from the camera 51 and stores the recognition result in the recognition result storing section 54. The client 56 can exclusively use the image recognition processing section 52 during only a time period determined for the client 56 by the client managing section 55. When a predetermined time period has elapsed, the client managing section 55 transfers the recognition result stored in the recognition result storing section 54 to the client 56 via the network 59.

Next, a description will be given of operation in the case that, for example, the clients 56 to 58 request image recognition processing to the client managing section 55 at about the same time. The client managing section 55 gives the right of use to the clients in the order in which the requests were received, and gives a predetermined recognition usage time period to the client given the right of use. When an elapsed time period of image recognition processing carried out by the mage recognition processing section 52 for the client given the right of use becomes equal to the above-mentioned recognition usage time period, the client managing section 55 changes the right of use to the next client. Namely, the client managing section 55 changes the right of use from the client 56 to the client 57 and the client 58 in this order at predetermined time intervals.

FIG. 6 is a diagram showing an example of control for changing the right of use of the shared image recognizing apparatus 50 (the image recognition processing section 52) by the clients 56 to 58.

Referring to FIG. 6, the clients 56 to 58 request image recognition processing to the client managing section 55 at a time t0. The image recognition processing section 52 carries out image recognition processing for a recognition object requested by the client 56 during a time period from the time t0 to a time t1. The image recognition processing section 52 carries out image recognition processing for a recognition object requested by the client 57 during a time period from the time t1 to a time t2. The image recognition processing section 52 carries out image recognition processing for a recognition object requested by the client 58 during a time period from the time t2 to a time t3.

As a related art in the above technical field, the flowing art has been proposed (see, for example, Japanese Laid-Open Patent Publication (Kokai) No. H10-42278).

However, the above-mentioned prior art has the following problem. As shown in FIG. 6, the client managing section 55 changes the right of use from the client 56 to the client 57 at the time t1 at which the time period for which the client 56 is given the right of use has elapsed. After that, the client managing section 55 changes the right of use from the client 57 to the client 58 at the time t2 at which the time period for which the client 57 is given the right of use has elapsed. In the conventional image recognizing system, such control is carried out to change the right of use. For this reason, there is the problem that waiting time before the start of image recognition processing for recognition objects requested by the client 57 and the client 58 is long.

SUMMARY OF THE INVENTION

The present invention provides an image recognizing apparatus, a control method, and a computer-readable storage medium that stores a program for implementing the method, which make it possible to shorten waiting time before the start of image recognition processing for recognition objects requested by each client.

Accordingly, in a first aspect of the present invention, there is provided an image recognizing apparatus that has an image recognizing unit that recognizes recognition objects in an image and sequentially gives the right of use of the image recognizing unit to a plurality of client apparatuses that have requested the right of use, comprising a registering unit adapted to register designating information designating recognition objects in an image and a recognition termination condition for terminating the recognition, which are transmitted from each of the client apparatuses that have requested the right of use, in association with each of the client apparatuses, and a managing unit adapted to cause the image recognizing unit to carry out recognition based on the registered designating information for the client apparatus given the right of use and carry out control to change the right of use to the next client apparatus when the registered recognition termination condition is satisfied.

Accordingly, in a second aspect of the present invention, there is provided a control method for an image recognizing apparatus that has an image recognizing unit that recognizes recognition objects in an image and sequentially gives the right of use of the image recognizing unit to a plurality of client apparatuses that have requested the right of use, comprising a registering step of registering designating information designating recognition objects in an image and a recognition termination condition for terminating the recognition, which are transmitted from each of the client apparatuses that have requested the right of use, in association with each of the client apparatuses, and a managing step of causing the image recognizing unit to carry out recognition based on the registered designating information for the client apparatus given the right of use and carrying out control to change the right of use to the next client apparatus when the registered recognition termination condition is satisfied.

Accordingly, in a third aspect of the present invention, there is provided a computer-readable storage medium that stores a program for causing a computer to execute a control method for an image recognizing apparatus that has an image recognizing unit recognizes recognition objects in an image and sequentially gives the right of use of the image recognizing unit to a plurality of client apparatuses that have requested the right of use, the control method comprising a registering step of registering designating information designating recognition objects in an image and a recognition termination condition for terminating the recognition, which are transmitted from each of the client apparatuses that have requested the right of use, in association with each of the client apparatuses, and a managing step of causing the image recognizing unit to carry out recognition based on the registered designating information for the client apparatus given the right of use and carrying out control to change the right of use to the next client apparatus when the registered recognition termination condition is satisfied.

According to the present invention, the client managing section sequentially gives the right of use to client apparatuses that have requested the right of use, and when the recognition termination condition registered in association with the client apparatus given the right of use is satisfied, the client managing section carries out control to change the right of use to the next client apparatus. This makes it possible to shorten waiting time before the start of image recognition processing for recognition objects requested by each client apparatus.

Further features of the present invention will become apparent from the following description of exemplary embodiments (with reference to the attached drawings).

BRIEF DESCRIPTION OF THE DRAWINGS

FIG. 2 is a diagram showing examples of recognition objects in image data and recognition termination conditions associated with clients in the image recognizing system in FIG. 1;

DESCRIPTION OF THE EMBODIMENTS

The present invention will now be described with reference to the drawings showing a preferred embodiment thereof.

Figure 1:
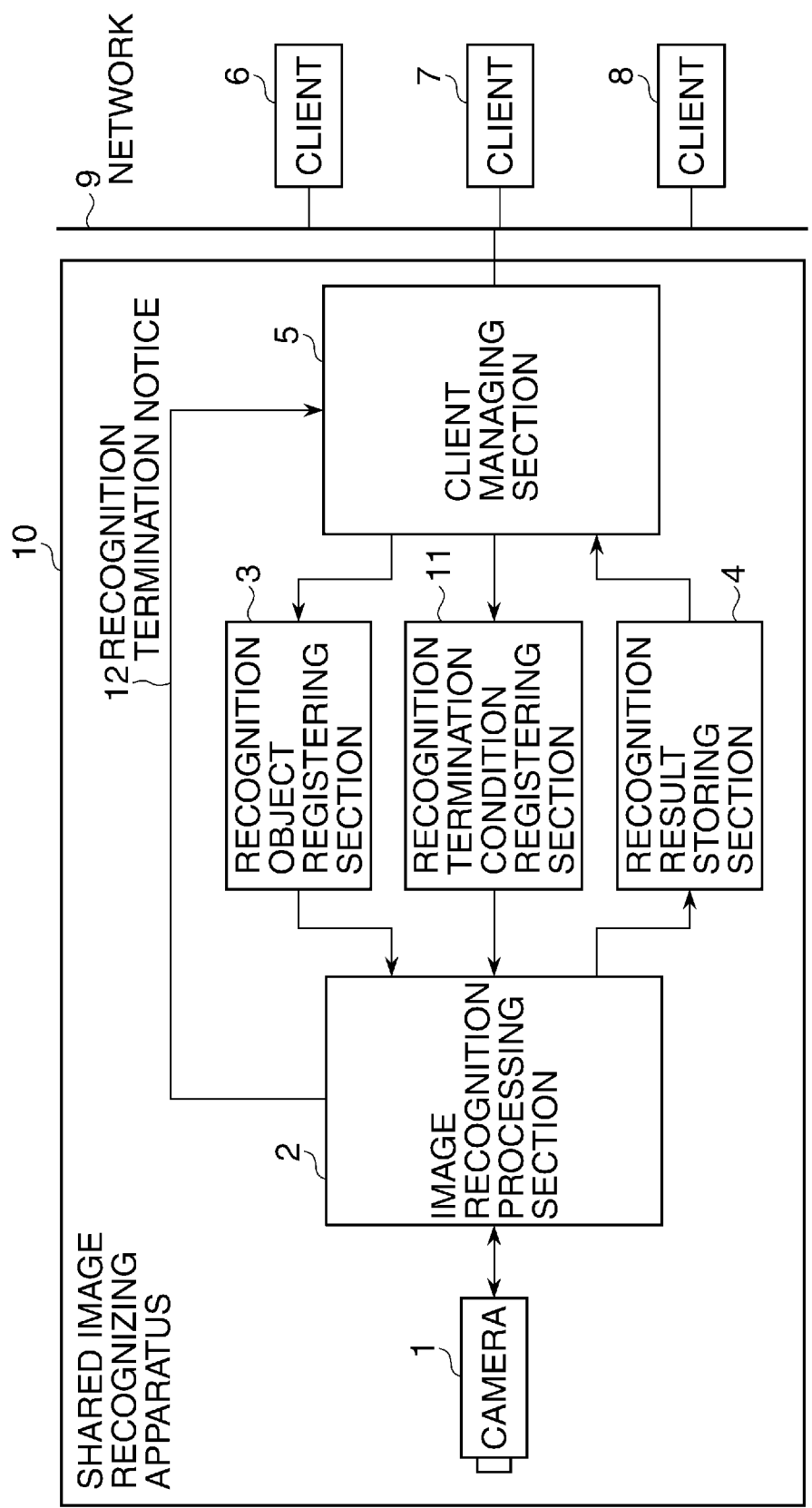
FIG. 1 is a block diagram schematically showing an example of the construction of an image recognizing system with a shared image recognizing apparatus at its center according to an embodiment of the present invention.

FIG. 1 is a block diagram schematically showing an example of the construction of an image recognizing system with a shared image recognizing apparatus at its center according to an embodiment of the present invention. It should be noted that the construction shown in FIG. 1 is an example for realizing an image recognizing unit, a registering unit, and a managing unit of the present invention.

Referring to FIG. 1, the image recognizing system is constructed such that a shared image recognizing apparatus 10 (an image recognizing apparatus), a client apparatus 6, a client apparatus 7, and a client apparatus 8 are connected together via a network 9 for communication with each other. The shared image recognizing apparatus 10 is comprised of a camera 1, an image recognition processing section 2 (an image recognizing unit), a recognition object registering section 3 (a registering unit), a recognition result storing section 4, a client managing section 5 (a managing unit), and a recognition termination condition registering section 11 (a registering unit). The client apparatus 6, the client apparatus 7, and the client apparatus 8 are configured as, for example, information processing apparatuses.

In the shared image recognizing apparatus 10, the camera 1 is an image pickup device that is configured as, for example, a video camera or a still camera to pick up an object, and outputs image data obtained through the pickup of the object to the image recognition processing section 2. The recognition object registering section 3 registers designating information, which designates recognition objects in image data in the image recognition processing by the image recognition processing section 2 and is transmitted from the each of the client apparatuses (hereafter referred to in abbreviated form as the clients), in association with each of the clients.

The designating information designating the recognition objects will be described later with reference to FIG. 2.

The recognition termination condition registering section 11 registers the number of recognition objects (the number of people in the case that the recognition objects are people) in image data by the image recognition processing section 2 as a recognition termination condition, which is transmitted from each of the clients and is for terminating image recognition processing carried out by the image recognition processing section 2, in association with each of the clients. The recognition termination conditions will be described later with reference to FIG. 2. The image recognition processing section 2 recognizes the recognition objects registered in the recognition object registering section 3 from image data inputted from the camera 1. The recognition result storing section 4 stores the recognition results obtained by the image recognition processing section 2.

The client managing section 5 carries out management to sequentially give the right of use of the shared image recognizing apparatus 10 (the image recognition processing section 2) to a plurality of clients that have requested the right of use of the shared image recognizing apparatus 10 (the image recognition processing section 2) at predetermined time intervals. Also, the client managing section 5 determines a recognition processing time period, during which the image recognition processing section 2 carries out image recognition processing, for each of the clients. Moreover, the client managing section 5 carries out a process in a flow chart of FIG. 3 described later in accordance with a control program.

In the above described shared image recognizing apparatus 10, upon recognizing recognition objects in image data corresponding to a number registered in the recognition termination condition registering section 11, the image recognition processing section 2 outputs (transmits) a recognition termination notice 12 to the client managing section 5. Upon receiving the recognition termination notice 12, the client managing section 5 changes the right of use from a client given the right of use of the shared image recognizing apparatus 10 (image recognition processing section 2) to the next client that is waiting to use the shared image recognizing apparatus 10 (image recognition processing section 2).

Namely, there are the following two conditions on which the client managing section 5 changes the right of use of the shared image recognizing apparatus 10 for the clients. The first condition is that a time period taken to carry out image recognition processing associated with a client given the right of use by the client managing section 5 has reached a recognition processing time period determined for the client. The second condition is that the image recognition processing section 2 has recognized recognition objects in image data corresponding to a number registered in the recognition termination condition registering section 11 in image recognition processing associated with a client given the right of use by the client managing section 5.

Figure 3:
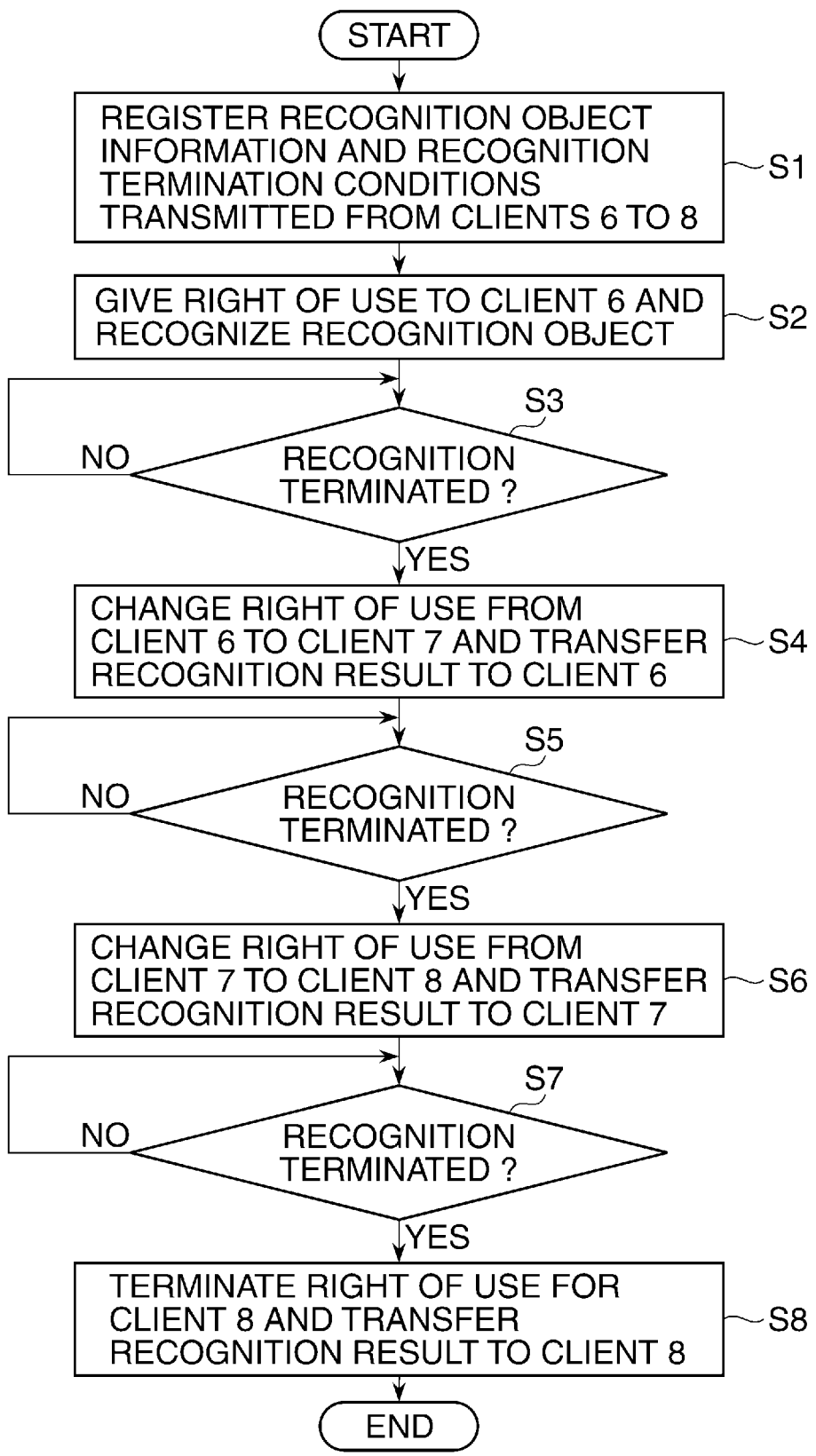
FIG. 3 is a flow chart showing an operation of the shared image recognizing apparatus in the image recognizing system in FIG. 1.
Figure 4:
FIG. 4 is a diagram showing an example of control for changing the right of use of the shared image recognizing apparatus by the clients in the image recognizing system in FIG. 1.
Figure 5:
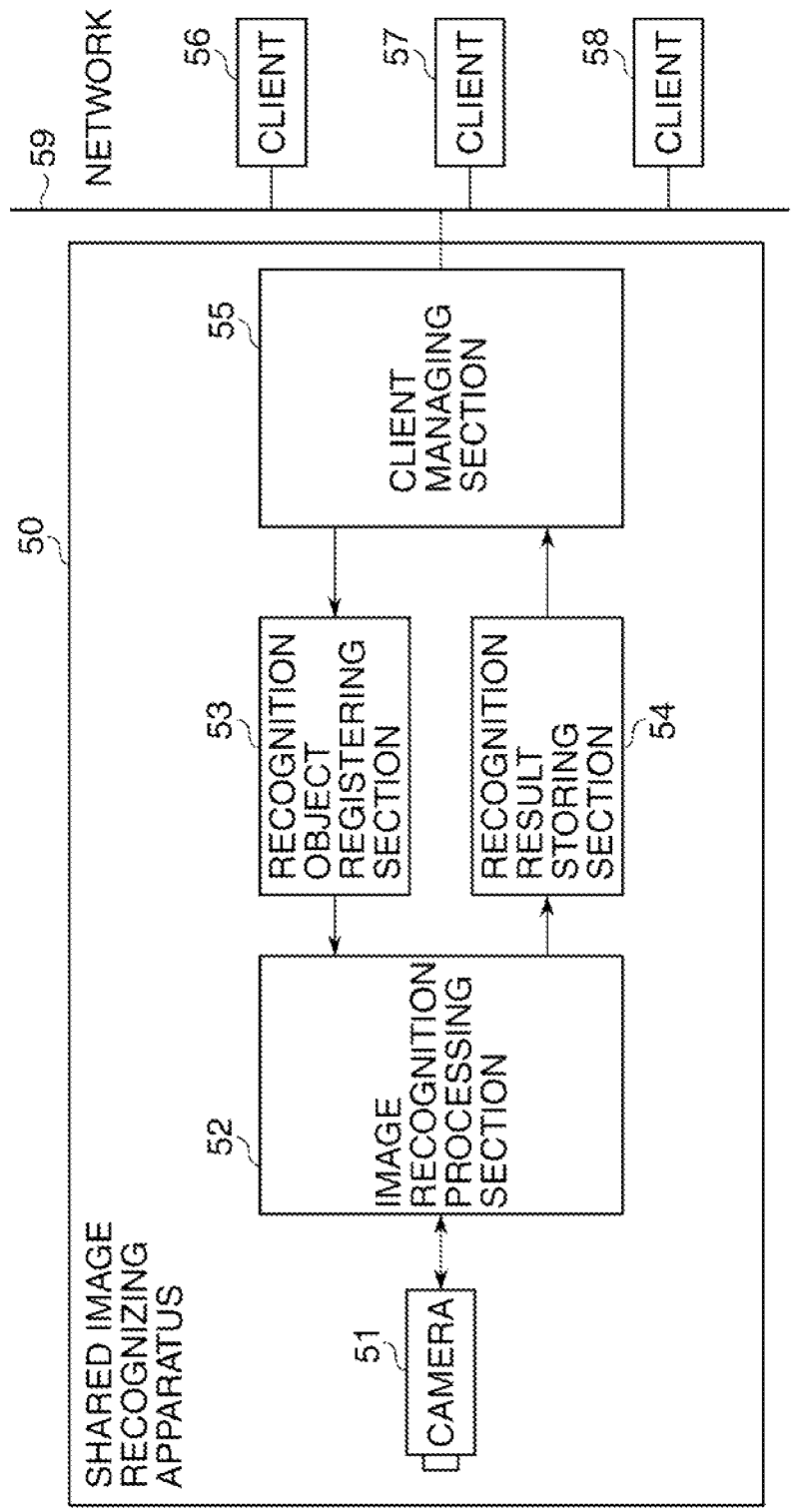
FIG. 5 is a block diagram schematically showing an example of the construction of an image recognizing system with a shared image recognizing apparatus at its center according to a prior art.
Figure 6:
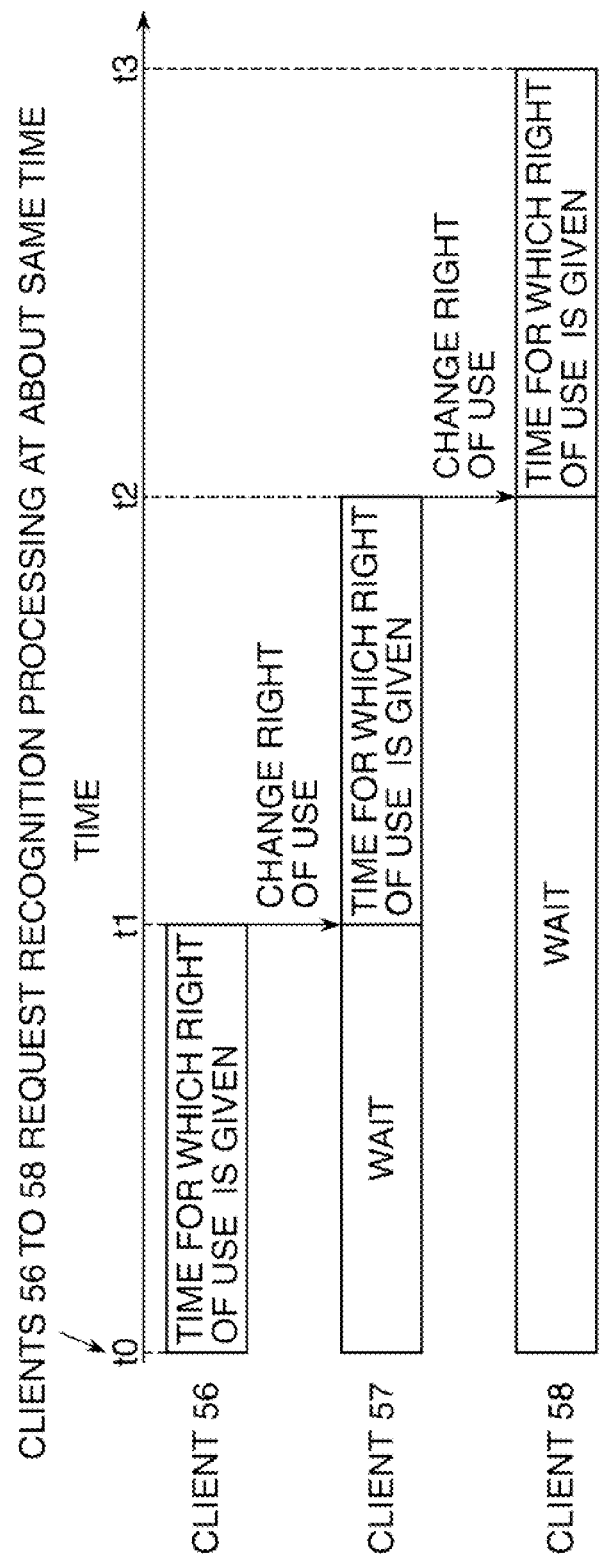
FIG. 6 is a diagram showing an example of control for changing the right of use of the shared image recognizing apparatus by clients in the image recognizing system in FIG. 5.

Referring next to FIGS. 2 to 4, a description will be given of an operation of the shared image recognizing apparatus 10 in the image recognizing system according to the present embodiment constructed as described above.

FIG. 2 is a diagram showing examples of recognition objects in image data and recognition termination conditions associated with the clients 6 to 8 in the image recognizing system.

Referring to FIG. 2, for example, males are requested as the recognition objects in the image data, and for example, three is requested as the recognition termination condition by the client 6. Also, for example, females are requested as the recognition objects in the image data, and for example, ten is requested as the recognition termination condition by the client 7. Also, for example, children are requested as the recognition objects in the image data, and for example, seven is requested as the recognition termination condition by the client 8.

In the present embodiment, it is assumed that the clients 6 to 8 request image recognition processing to the shared image recognizing apparatus 10 at about the same time. The clients 6 to 8 request image recognition processing by transmitting designating information, which designates recognition objects in image data, and numbers as recognition termination conditions (the number of people in the case that the recognition objects are people) to the shared image recognizing apparatus 10 via the network 9. In the shared image recognizing apparatus 10, image recognition processing is terminated when the above recognition termination conditions are satisfied in processing in which the image recognition processing section 2 recognizes the recognition objects in the image data.

FIG. 3 is a flow chart showing the operation of the shared image recognizing apparatus 10 in the image recognizing system.

Referring to FIG. 3, when image recognition processing requests are transmitted from the clients 6 to 8, the client managing section 5 of the shared image recognizing apparatus 10 carries out registration as described hereafter. The client managing section 5 registers information that designates recognition objects for the clients 6 to 8 in the recognition object registering section 3, and registers numbers as recognition termination conditions in the recognition termination condition registering section 11 (step S1). The client managing section 5 sequentially gives the right of use of the shared image recognizing apparatus 10 (the image recognition processing section 2) to the clients 6 to 8 when the recognition termination conditions are satisfied. It is assumed here that the right of use is given to the client 6, the client 7, and the client 8 in this order.

First, the client managing section 5 gives the right of use of the shared image recognizing apparatus 10 to the client 6 and causes the image recognition processing section 2 to recognize males as the recognition objects requested by the client 6 from image data inputted from the camera 1 (step S2). If the image recognition processing section 2 can recognize males as the recognition objects requested by the client 6 from the image data, the client managing section 5 stores the recognition result in the recognition result storing section 4.

The recognition termination condition for the client 6 is that the number of recognized objects reaches three. If three males as the recognition objects requested by the client 6 can be recognized from the image data, the image recognition processing section 2 outputs the recognition termination notice 12 to the client managing section 5. Upon receiving the recognition termination notice 12 from the image recognition processing section 2 before a recognition processing time period set in advance has elapsed (YES in step S3), the client managing section 5 carries out control described hereafter. The client managing section 5 changes the right of use of the shared image recognizing apparatus 10 from the client 6 to the client 7 as the next client. Further, the client managing section 5 transfers the recognition result stored in the recognition result storing section 4 to the client 6 (step S4).

Next, the recognition termination condition for the client 7 is that the number of recognized objects reaches ten. If ten females as the recognition objects requested by the client 7 can be recognized from the image data, the image recognition processing section 2 outputs the recognition termination notice 12 to the client managing section 5. Upon receiving the recognition termination notice 12 from the image recognition processing section 2 before a recognition processing time period set in advance has elapsed (YES in step S5), the client managing section 5 carries out control described hereafter. The client managing section 5 changes the right of use of the shared image recognizing apparatus 10 from the client 7 to the client 8 as the next client. Further, the client managing section 5 transfers the recognition result stored in the recognition result storing section 4 to the client 7 (step S6).

Next, the recognition termination condition for the client 8 is that the number of recognized objects reaches seven. If seven children as the recognition objects requested by the client 8 can be recognized from the image data, the image recognition processing section 2 outputs the recognition termination notice 12 to the client managing section 5. Upon receiving the recognition termination notice 12 from the image recognition processing section 2 before a recognition processing time period set in advance has elapsed (YES in step S7), the client managing section 5 carries out control described hereafter. The client managing section 5 terminates the right of use of the shared image recognizing apparatus 10 by the client 8. Further, the client managing section 5 transfers the recognition result stored in the recognition result storing section 4 to the client 8 (step S8).

FIG. 4 is a diagram showing an example of control for changing the right of use of the shared image recognizing apparatus 10 (image recognition processing section 2) by the clients 6 to 8 in the image recognizing system.

Referring to FIG. 4, there is shown how the clients 6 to 8 use the shared image recognizing apparatus 10 with the passage of time. The clients 6 to 8 request image recognition processing to the shared image recognizing apparatus 10 at about the same time at a time t0. The client 6 is given the right of use of the shared image recognizing apparatus 10 during a time period from the time t0 to a time t1. The recognition termination condition is satisfied at a time t3, and hence the client managing section 5 changes the right of use of the shared image recognizing apparatus 10 from the client 6 to the client 7. Namely, the time t3 is earlier than the time t1, and it is thus unnecessary for the client 7 to wait until the time t1 to obtain the right of use of the shared image recognizing apparatus 10.

The image recognition processing section 2 starts image recognition processing for the recognition objects requested by the client 7 at the time t3. Next, the client 7 is given the right of use during a time period from the time t3 to a time t5. The recognition termination condition is satisfied at a time t4, and hence the client managing section 5 changes the right of use of the shared image recognizing apparatus 10 from the client 7 to the client 8. As a result, it is unnecessary for the client 8 to wait to obtain the right of use of the shared image recognizing apparatus 10 for a total time period of a time period from the time t3 to the time t1 for the client 6 and a time period from the time t4 to the time t5 for the client 7.

As is clear from FIG. 4, waiting time before the start of image recognition processing associated with the client 7 and the client 8 is shortened. It is thus possible to solve the problem that waiting time before the start of image recognition processing is long as in the prior art.

As described above, the following effects can be obtained according to the present embodiment. The client managing section 5 registers information designating recognition objects transmitted from clients that have requested the right of use of the shared image recognizing apparatus in the recognition object registering section 3, and registers recognition termination conditions transmitted from clients that have requested the right of use of the shared image recognizing apparatus in the recognition termination condition registering section 11. Also, the client managing section 5 causes the image recognition processing section 2 to carry out processing in which the recognition objects are recognized from image data for a client that is given the right of use first, and carries out control to change the right of use to the next client when the recognition termination condition is satisfied.

Namely, in the case that a plurality of clients share the shared image recognizing apparatus and carry out processing to recognize recognition objects in image data using the image recognition processing section 2, the client managing section 5 carries out control to change the right of use of the shared image recognizing apparatus according to recognition termination conditions for the respective clients. This makes it possible to shorten waiting time before the start of image recognition processing for the recognition objects requested by the clients.

Although in the above described embodiment, it is assumed that the shared image recognizing apparatus is constructed as shown in FIG. 1, the present invention is not limited to this. For example, the camera 1 may be configured separately (a separate body) from the shared image recognizing apparatus, and the shared image recognizing apparatus may have the image recognition processing section 2, the recognition object registering section 3, the recognition result storing section 4, the client managing section 5, and the recognition termination condition registering section 11.

Although in the above described embodiment, it is assumed that the three clients are connected to the shared image recognizing apparatus via the network, the present invention is not limited to this. The number of clients connected to the shared image recognizing apparatus may be determined according to the specification of the image recognizing system.

Although in the above described embodiment, no reference is made to the field of application of the image recognizing system, the present invention may be applied to various fields such as a surveillance camera system.

Other Embodiments

Aspects of the present invention can also be realized by a computer of a system or apparatus (or devices such as a CPU or MPU) that reads out and executes a program registered on a memory device to perform the functions of the above-described embodiment, and by a method, the steps of which are performed by a computer of a system or apparatus by, for example, reading out and executing a program registered on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-256371 filed Oct. 1, 2008, which is hereby incorporated by reference herein in its entirety.

What is claimed is:

1. An image recognizing apparatus that has an image recognizing unit that recognizes recognition objects in an image and sequentially gives the right of use of the image recognizing unit to a plurality of client apparatuses that have requested the right of use, comprising:

a registering unit adapted to register designating information designating recognition objects in an image and the number of recognition objects as a recognition termination condition for terminating the recognition, which are transmitted from each of the client apparatuses that have requested the right of use, in association with each of the client apparatuses; and a managing unit adapted to cause the image recognizing unit to carry out recognition based on the registered number of recognition objects for the client apparatus given the right of use and carry out control to change the right of use to the next client apparatus when the number of recognition objects, which is registered in association with the client apparatus given the right of use, have been recognized by the image recognizing unit.

2. An image recognizing apparatus according to claim 1, wherein said managing unit carries out control to change the right of use to the next client apparatus when a recognition processing time period determined in advance for the client apparatus given the right of use has elapsed.

3. An image recognizing apparatus according to claim 2, wherein said managing unit carries out control to change the right of use to the next client apparatus if the recognition termination notice is received from the image recognizing unit before the recognition processing time period determined in advance for the client apparatus given the right of use has elapsed.

4. An image recognizing apparatus according to claim 1, wherein the image for recognizing the recognition objects using the image recognizing unit includes an image picked up by an image pickup device, the recognition objects includes people in the image, and the number of recognition objects includes the number of people.

5. A control method for an image recognizing apparatus that has an image recognizing unit that recognizes recognition objects in an image and sequentially gives the right of use of the image recognizing unit to a plurality of client apparatuses that have requested the right of use, comprising:

a registering step of registering designating information designating recognition objects in an image and the number of recognition objects as a recognition termination condition for terminating the recognition, which are transmitted from each of the client apparatuses that have requested the right of use, in association with each of the client apparatuses; and a managing step of causing the image recognizing unit to carry out recognition based on the registered number of recognition objects for the client apparatus given the right of use and carrying out control to change the right of use to the next client apparatus when the number of recognition objects, which is registered in association with the client apparatus given the right of use, have been recognized by the image recognizing unit.

6. A non-transitory computer-readable storage medium that stores a program for causing a computer to execute a control method for an image recognizing apparatus that has an image recognizing unit that recognizes recognition objects in an image and sequentially gives the right of use of the image recognizing unit to a plurality of client apparatuses that have requested the right of use, the control method comprising:

a registering step of registering designating information designating recognition objects in an image and the number of recognition objects as a recognition termination condition for terminating the recognition, which are transmitted from each of the client apparatuses that have requested the right of use, in association with each of the client apparatuses; and a managing step of causing the image recognizing unit to carry out recognition based on the registered number of recognition objects for the client apparatus given the right of use and carrying out control to change the right of use to the next client apparatus when the number of recognition objects, which is registered in association with the client apparatus given the right of use, have been recognized by the image recognizing unit.

* * * * *